J. F. & H. E. DODGE.
MEANS FOR SUPPORTING AND ADJUSTING ROTARY DEVICES.
APPLICATION FILED AUG. 15, 1916.
1,212,461.
Patented Jan. 16, 1917.
3 SHEETS—SHEET 1.
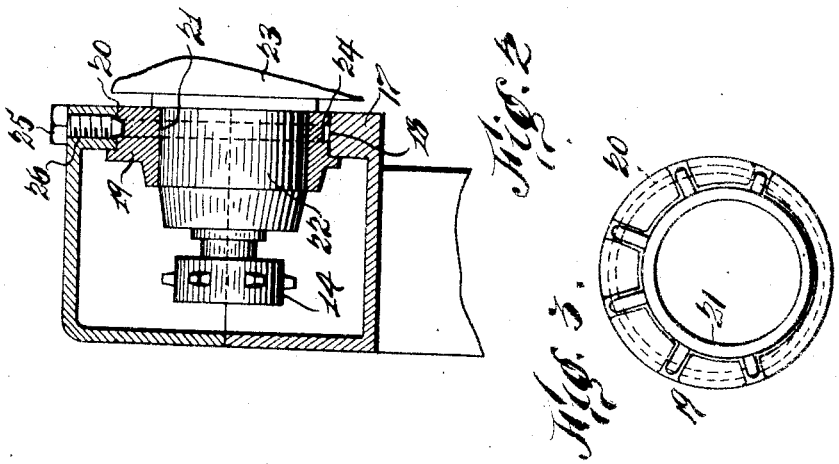
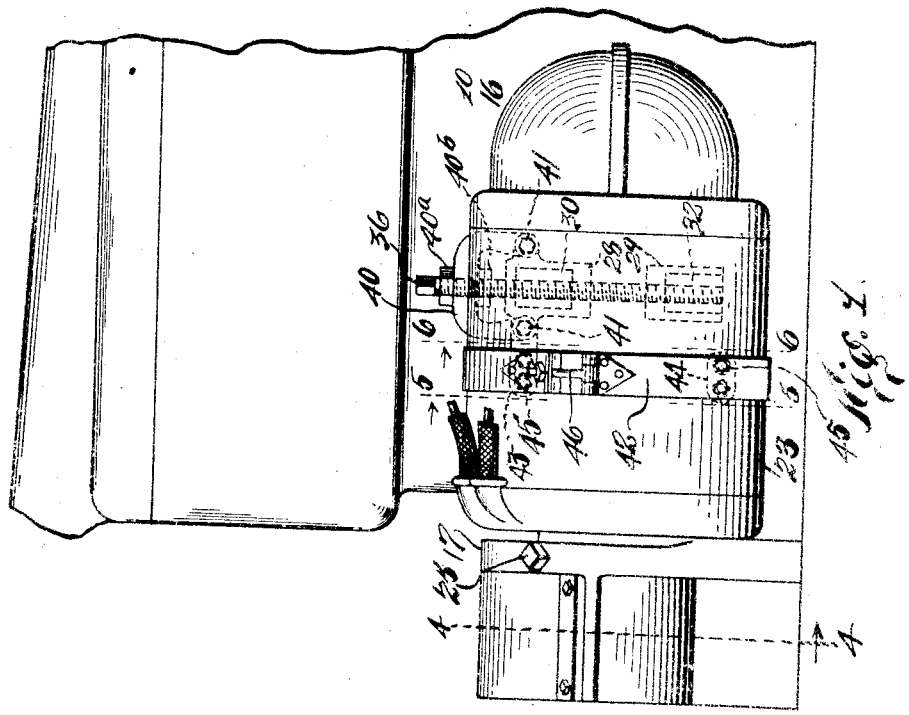
Inventors
John F. Dodge.
Horace E. Dodge.
By their Attorney

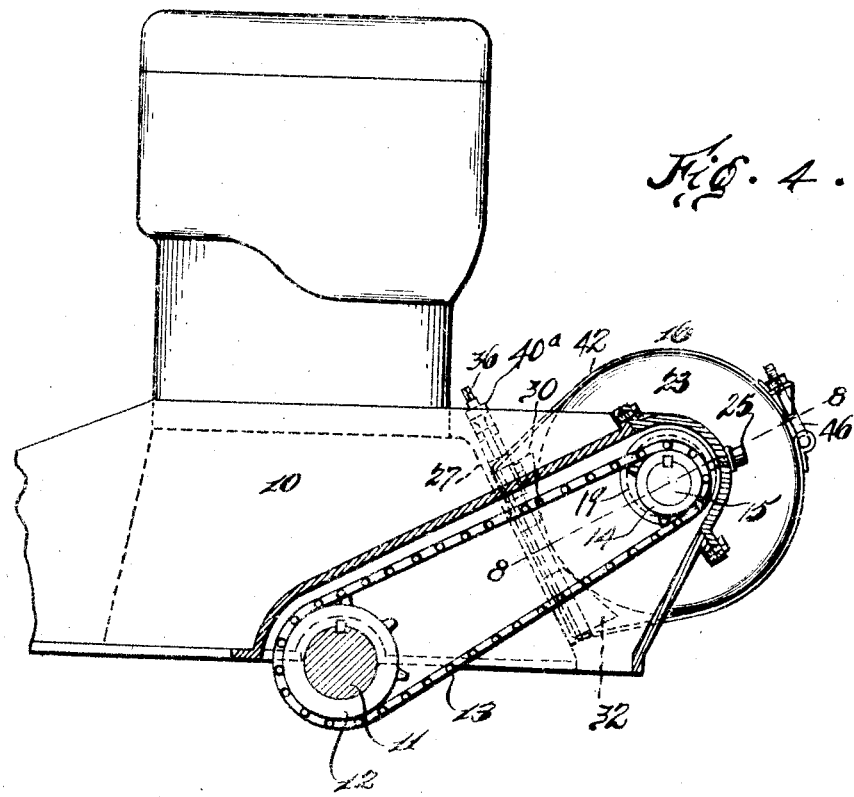
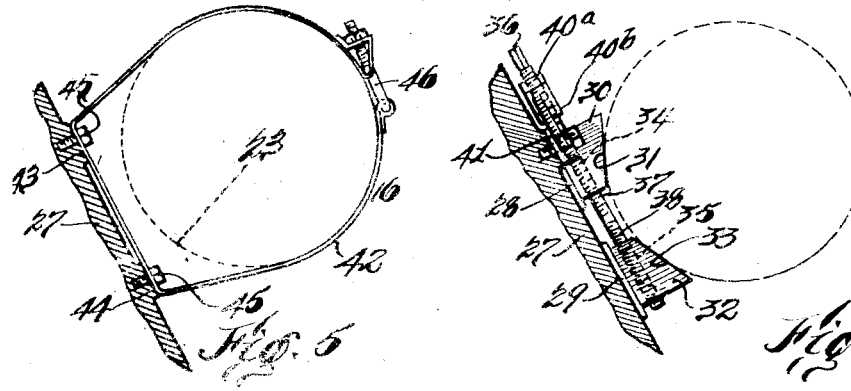

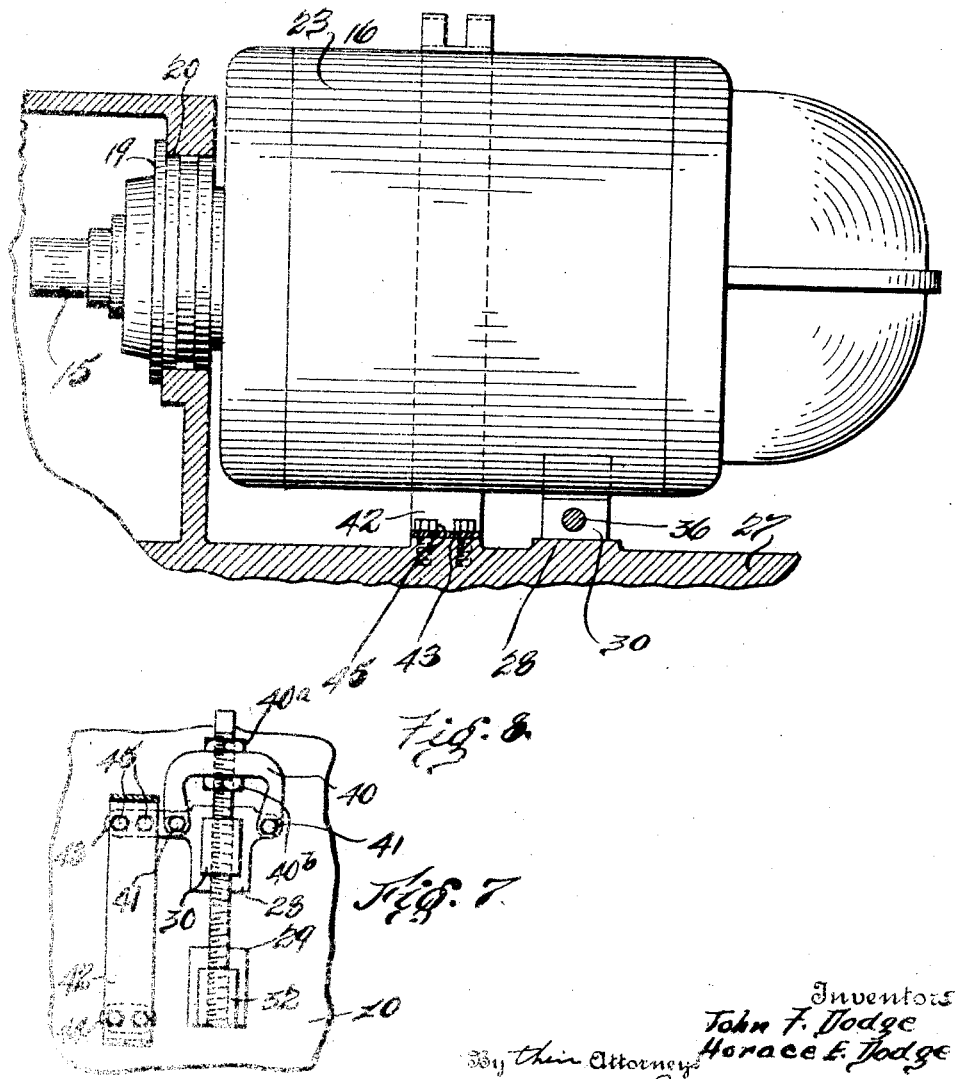

UNITED STATES PATENT OFFICE.

JOHN F. DODGE, OF DETROIT, AND HORACE E. DODGE, OF GROSSE POINTE, MICHIGAN, ASSIGNORS TO DODGE BROTHERS, OF DETROIT, MICHIGAN, A CORPORATION OF MICHIGAN.

MEANS FOR SUPPORTING AND ADJUSTING ROTARY DEVICES.

1,212,461.  Specification of Letters Patent.  Patented Jan. 16, 1917.

Application filed August 15, 1916. Serial No. 114,978.

*To all whom it may concern:*

Be it known that we, JOHN F. DODGE and HORACE E. DODGE, citizens of the United States, residing at Detroit, Michigan, and Grosse Pointe, Michigan, respectively, have invented certain new and useful Improvements in Means for Supporting and Adjusting Rotary Devices, of which the following is a clear, full, and exact description.

The present invention relates to means for supporting and adjusting rotary devices such as starters and generators which are used in motor cars, and it embodies improvements in the apparatus shown and described in our prior Patent #1,174,551, dated March 7th, 1916.

An object of the invention is to provide adjustable means between the starter and the crank case for forcing the starter away from the crank case, by the operation of an element such as a screw-spindle.

Further objects are to provide simple, practical and efficient means for supporting and adjusting rotary devices, such for instance as electric starters, and to utilize the adjustment for the purpose of tightening a flexible connection such as a driving chain.

These being among the objects of the present invention, the same consists of certain features of construction and combinations of parts to be hereinafter described and then claimed with reference to the accompanying drawings illustrating an embodiment of the invention and in which—

Figure 1 is a side elevation of a casing for an electric generator and starter and gearing, with the supporting and adjusting means therefor as in the preferred form of the invention; Fig. 2 is a detail section showing how one end of the starter may be supported; Fig. 3 is a detail view of a preferred form of rotatable adjusting member at said end of the starter; Fig. 4 is a transverse section on the line 4—4 Fig. 1; Fig. 5 is a transverse section on the line 5—5 Fig. 1, showing the preferred form of intermediate adjustable support for the starter; Fig. 6 is a transverse section on the line 6—6 Fig. 1, showing the preferred form of the adjustable wedge device; Fig. 7 is an elevation, parts being broken away to show the adjustable wedge device in plan; and Fig. 8 is a section on the line 8—8 Fig. 4, the starter casing being shown in elevation.

Referring to the drawings, the casing 10 for the crank shaft has journaled therein the engine or crank shaft 11 provided with a sprocket wheel 12, over which runs a sprocket chain 13 which also runs over sprocket wheel 14 on the end of the shaft 15 of an electric starter and generator 16, which is one form of rotary device to which the present invention may be applied. The casing 10 is provided with an outwardly extending wall at 17, having a circular opening 18 and which provides a supporting part for an annular adjustable member or ring 19, the peripheral surface 20 of which bears on the wall of the opening 18, preferably as in aforesaid patent. Said adjusting member is notched or otherwise constructed so as to enable the turning thereof by the use of a suitable operating tool. Into its opening 21 is set a portion 22 of the housing or casing 23 of the electric starter and generator 16, said opening 21 being eccentric to the central axis of the annular member 19, so that the axis of said member and the axis of the shaft 15 of the starter and generator are parallel with each other. Preferably, as in aforesaid patent, an annular groove 24 is formed in the periphery of the adjusting member 19, into which a set-screw 25 is adapted to engage, for the purpose of fixing said member in adjusted position after it has been rotated for tightening up the sprocket chain and adjusting the starter and generator. Said set-screw turns in a suitable screw-threaded orifice 26 in the supporting part 17.

Suitable seating means underlie the outer end of the housing of the rotary shaft 15 and constitute a support against which said housing may be secured and which tends to center the shaft and said housing, as shown more clearly in Figs. 6, 7 and 8. Said seating means is adjustable so that the starter can be forced away from the crank case or allowed to approach it. The preferred construction is mounted upon the inclined wall 27 of the crank case which is provided with raised guide portions 28, 29, upon which a pair of wedge members or blocks 30, 32 are adapted to rest and slide. Said wedge members underlie the outer end of the starter and are respectively provided with inclined seat surfaces 31, 33, which are inclined outwardly from a point between said wedge members. Said surfaces therefore furnish a tapering seat for the outer end of the housing of the starter. The wedge members 30, 32 are provided with alined, oppositely screw-threaded, bores or perforations 34, 35, which receive a screw-threaded spindle 36 provided with oppositely screw-threaded portions 37, 38, which engage with the correspondingly screw-threaded wedge members 30, 32. One end of said spindle may be square to receive a wrench, or otherwise provided with means whereby the spindle may be rotated for adjusting the wedge members to or from each other, and hence moving the starter away from the inclined wall 27 or permitting it to approach it. A supporting yoke 40 is secured at points 41 to the inclined wall 27 and is provided with a screw-threaded opening into which the screw-spindle 36 is threaded, and therefore constitutes a support for said spindle. Nuts 40ª and 40ᵇ may be provided for fixing the spindle, and hence the wedge members, in their adjusted position.

Preferably located between the annular adjusting member 19 and the wedge members 30, 32, is a flexible band or strap 42, which is fixed at its intermediate portion to raised portions 43, 44 of the wall 27, by means of screws 45. The outer ends of said strap may be connected together by means such as the releasable connecting bolt or fastening 46 and concomitant parts described in aforesaid patent. It will be seen that the flexible member or strap 42 can be adjusted in accordance with the adjustment obtained by the wedge members 30, 32 in order to secure the starter in the desired position.

From the above it will be seen that the starter and its parts are supported at a number of different places so disposed as to permit of the proper support and adjustment of the starter. That is to say, there is a place of contact or support at the annular adjusting member 19 and another at the wedge members 30, 32, located under the outer end of the starter so that the starter can be adjusted to desired position by the proper adjustment of said adjusting member and wedge members. The third place of support or contact is upon the flexible band or member 42, which is preferably located in a plane transverse of the inclined wall 27, which plane is substantially parallel with the planes of the adjusting member 19 and the wedge members 31, 32. It is believed that the two separated wedge members forming two separate supports at the underside of the starter are especially desirable, as they provide two supporting forces which tend to hold the starter against movement parallel with the inclined wall 27. This is particularly desirable when a clamping band such as 42 is used, for the reason that said band exerts a pressure principally in a direction normal to the inclined wall 27 and has but little restraining effect in a direction parallel with said wall.

It is obvious that the present invention may also be used in connection with devices such as water pumps, magnetos, etc., and that it is susceptible of modification, as parts may be omitted, parts added and parts substituted without departing from the spirit of the invention as expressed in the claims.

What we claim as new is:—

1. In apparatus of the class described, the combination of supporting means, an adjustable member mounted on said means, a shaft adjustable by said member at one portion of its length, an adjustable support opposite another portion of said shaft located between said shaft and said supporting means, and releasable means associated with said adjustable support but located between said adjustable member and said adjustable support for holding said shaft in a predetermined position relatively to it, said adjustable support and said releasable holding means being adapted for adjusting the shaft in accordance with the adjustment obtained by said adjustable member.

2. In apparatus of the class described, the combination of supporting means, an adjustable member mounted on said means, a shaft adjustable by said member at one portion of its length, an adjustable support opposite another portion of said shaft located between said shaft and said supporting means, and flexible means associated with said adjustable support but located between said adjustable member and said adjustable support for holding said shaft in a predetermined position relatively to it, said adjustable support and said flexible means being adapted for adjusting the shaft in accordance with the adjustment obtained by said adjustable member.

3. In apparatus of the class described, the combination of supporting means, an adjustable member mounted on said means, a shaft adjustable by said member at one portion of its length, two adjustable supporting members having seat surfaces inclined outwardly away from a point intermediate thereof and located between said shaft and said supporting means, and means associated with said supporting members but located between said adjustable member and said adjustable supporting members for centering said shaft toward said intermediate point, said adjustable supporting members and said centering means being adapted for adjusting the shaft in accordance with the adjustment obtained by said adjustable member.

4. In apparatus of the class described, the combination of supporting means, an adjustable member mounted on said means, the housing of which is a power device, adjustable by said member at one end, an adjustable support opposite another portion of said housing located between said housing and said supporting means, and releasing means associated with said adjustable support but located between said adjustable member and said adjustable support for holding said housing in a predetermined position relatively to it, said adjustable support and said releasable holding means being adapted for adjusting the housing in accordance with the adjustment obtained by said adjustable member.

5. In apparatus of the class described, the combination of supporting means, an adjustable member mounted on said means, a power device having a housing which is adjustable by said member at one end, two adjustable supporting members having seat surfaces inclined outwardly away from a point intermediate thereof, and located between said housing and said supporting means, and means associated with said supporting members but located between said adjustable member and said adjustable supporting members for centering said housing toward said intermediate point, said adjustable supporting members and said centering means being adapted for adjusting the housing in accordance with the adjustment obtained by said adjustable member.

6. In apparatus of the class described, the combination of supporting means, an adjustable member mounted on said means, a power device, having a housing which is adjustable by said member at one end, two adjustable supporting members mounted on adjustable supporting means and having seat surfaces inclined outwardly away from a point intermediate thereof, and located between said housing and said supporting means, and flexible means associated with said supporting members but located between said adjustable member and said adjustable supporting members for centering said housing toward them and holding it in a predetermined position relatively to the seat furnished by said supporting members, said adjustable supporting members and said centering means being adapted for adjusting the shaft in accordance with the adjustment obtained by said adjustable member.

7. In apparatus of the class described, the combination of supporting means, a shaft, adjustable means mounted on said supporting means, supporting said shaft at one portion thereof, and adapted to position said shaft in a number of different directions laterally with respect to a central point, and additional adjustable means located opposite another portion of said shaft for adjusting the shaft in accordance with the adjustment obtained by said first adjustable means, said additional adjustable means comprising a binding strap and a seat lateral thereof for holding said shaft against displacement relatively to said supporting means.

8. In apparatus of the class described, the combination of supporting means, a power device having a housing, adjustable means mounted on said supporting means, supporting said housing at one end thereof, and adapted to position said housing in a number of different directions laterally with respect to a central point, and additional adjustable means located opposite another portion of said housing for adjusting the housing in accordance with the adjustment obtained by said first adjustable means, said additional adjustable means comprising a binding strap and a seat lateral thereof for holding said housing against displacement relatively to said supporting means.

9. In apparatus of the class described, the combination of a case having a supporting surface on a lateral wall thereof and a support extending outwardly from said surface, an engine shaft in said case, a power-applying starter for said shaft, and means for supporting and adjusting said starter on said outward support sidewise of said surface, and adjustable wedging means between said surface and said starter for adjusting said starter upon said surface in substantial accordance with the adjustment obtained by the said first means.

10. In apparatus of the class described, the combination of a case having a supporting surface on a lateral wall thereof and a support extending outwardly from said surface, an engine shaft in said case, a power-applying starter for said shaft having a housing provided with an extension neck, and means for supporting and adjusting the said housing at said neck upon said outward support sidewise of said surface, and adjustable wedging means between said surface and said housing for adjusting said starter upon said surface in substantial accordance with the adjustment obtained by the said first means.

11. In apparatus of the class described, the combination of supporting means, a shaft, an adjustable support for said shaft, located on said supporting means between it and said shaft, and shaft encompassing means associated with said adjustable support and located to one side thereof for holding said shaft in a predetermined position relatively to said adjustable support.

12. In apparatus of the class described, the combination of supporting means, a power device having a housing, an adjustable support for said housing, located on said supporting means between it and said housing, and housing encompassing means associated with said adjustable support for holding said housing in a predetermined position relatively to said adjustable support.

13. In apparatus of the class described, the combination of supporting means, a shaft, two relatively adjustable supporting members mounted on said supporting means and having seat surfaces inclined outwardly away from a point intermediate thereof, and located between said shaft and said supporting means, and means associated with said supporting members for centering said shaft toward them and holding it in a predetermined position relatively to the seat furnished by said supporting members.

14. In apparatus of the class described, the combination of supporting means, a power device having a housing, two relatively adjustable supporting members mounted on said supporting means and having seat surfaces inclined outwardly away from a point intermediate thereof, and located between said housing and said supporting means, and means associated with said supporting members for centering said housing toward them and holding it in a predetermined position relatively to the seat furnished by said supporting members.

15. In apparatus of the class described, the combination of a supporting part, a shiftable starter and generator and its housing, an adjusting member mounted rotatably on said supporting part, means for supporting the end of said housing on said adjusting member eccentrically with respect to the axis of said member, whereby said starter and generator can be adjusted laterally, and relatively offset devices for retaining said starter and generator as so adjusted.

16. In apparatus of the class described, the combination of a supporting part, a shiftable starter and generator and its housing, an adjusting member mounted rotatably on said supporting part, means for supporting the end of said housing on said adjusting member eccentrically with respect to the axis of said member, and relatively offset devices for retaining said starter and generator as so adjusted, an engine shaft, and a chain-and-sprocket connection between the said shaft and the shaft of said starter, whereby said starter and generator can be adjusted laterally and said chain tightened.

17. In apparatus of the class described, the combination of a crank case, an engine shaft therein, a starter and generator, an endless flexible connection between the shaft of the latter and said engine shaft and means comprising devices movable in opposition for tightening up said connection and for rigidly supporting and bodily adjusting said starter and generator upon said crank case.

18. In apparatus of the class described, the combination of a crank case, an engine shaft therein, a starter and generator, an endless flexible connection between the shaft of the latter and said engine shaft, means for tightening up said connection and for bodily adjusting said starter and generator upon said crank case, and means in addition to said tightening means comprising devices movable in opposition for rigidly supporting and holding said starter and generator in adjusted position upon said crank case.

19. In apparatus of the class described, the combination of a supporting part having an annular opening, a shiftable starter and generator and its housing, and an annular adjusting member mounted rotatably in said opening, and provided with an opening eccentric to its axis, in which opening the end of said housing is journaled, an engine shaft, a chain-and-sprocket connection for said shaft and the shaft of said starter and generator, relatively adjustable supporting wedges at one side of said starter and generator, and a strap or band encircling said starter and generator to coöperate with said wedges in adjusting said starter and generator.

20. In apparatus of the class described, the combination of supporting means, a shaft, separate means at two points along said shaft for adjusting it upon said supporting means, and means removed from said two points for securing said shaft in its adjusted position.

21. In apparatus of the class described, the combination of supporting means, a shaft, separate means at two points along said shaft for adjusting it upon said supporting means, and shaft encompassing means removed from said two points for securing said shaft in its adjusted position.

22. In apparatus of the class described, the combination of supporting means, a shaft, separate means at two points along said shaft for adjusting it upon said supporting means, one of said adjusting means comprising relatively movable wedge members, and means removed from said two points for securing said shaft in its adjusted position.

23. In apparatus of the class described, the combination of supporting means, a power device having a housing, separate means at two points along said housing for adjusting it upon said supporting means, and means laterally removed from said two points for securing said housing in its adjusted position.

24. In apparatus of the class described, the combination of supporting means, a power device having a housing, separate means at two points along said housing for adjusting it upon said supporting means, and housing encompassing means laterally removed from said two points adapted to bind upon the outer surface of said housing for securing said housing in its adjusted position.

25. In apparatus of the class described, the combination of supporting means, a power device having a housing, separate means at two points along said housing for adjusting it upon said supporting means, one of said adjusting means comprising relatively movable wedge members guided on said supporting means and bearing on said housing, and means laterally removed from said two points for securing said housing in its adjusted position.

26. In apparatus of the class described, the combination of a case having a supporting surface, an engine shaft in said case, a power-applying starter, means for transmitting power from said starter to said shaft, means for supporting and adjusting said starter upon said surface at two separate points along its axis and for adjusting said power transmitting means, and means laterally removed from said two points for securing said starter in its adjusted position.

27. In apparatus of the class described, the combination of a case having a supporting surface, an engine shaft in said case, a power-applying starter, means for transmitting power from said starter to said shaft, means for supporting and adjusting said starter upon said surface at two separate points along its axis and for adjusting said power transmitting means, said adjusting means comprising movable wedge members between said surface and said starter, and means laterally removed from said two points for securing said starter in its adjusted position.

28. In apparatus of the class described, the combination of a case having a supporting surface, an engine shaft in said case, a power-applying starter, means for transmitting power from said starter to said shaft, means for supporting and adjusting said starter upon said surface at two separate points along its axis and for adjusting said power transmitting means, said adjusting means comprising movable wedge members between said surface and said starter and a rotatable member for simultaneously adjusting said wedge members, and means laterally removed from said two points for securing said starter in its adjusted position.

29. In apparatus of the class described, the combination of a crank case, an engine shaft therein, a starter having a driving connection with said shaft, and means for adjusting said connection and for rigidly supporting and bodily adjusting said starter upon said crank case, said adjusting means comprising movable wedge members adapted to bear on said starter.

30. In apparatus of the class described, the combination of a crank case, an engine shaft therein, a starter having a driving connection with said shaft, and means for adjusting said connection and for rigidly supporting and bodily adjusting said starter upon said crank case, said adjusting means comprising oppositely movable wedge members adapted to bear on said starter, and a rotatable member for simultaneously adjusting said wedge members.

31. In apparatus of the class described, the combination of a case, an engine shaft therein, a housed starter having at one end a driving connection with said shaft, and wedge members movably mounted upon said case to bear upon and adjust the other end of the housing of said starter.

32. In apparatus of the class described, the combination of a case, an engine shaft therein, a housed starter having at one end a driving connection with said shaft, wedge members movably mounted upon said case to bear upon and adjust the other end of the housing of said starter, and means for moving said wedge members in opposite directions.

33. In apparatus of the class described, the combination of a case, an engine shaft therein, a housed starter having at one end a driving connection with said shaft, and wedge members movably mounted upon said case to bear upon and adjust the other end of the housing of said starter, said members being reversely screw-threaded, and a right and left screw-threaded spindle engaging the screw-threads of said members, to move the same in opposite directions.

34. In apparatus of the class described, the combination of a power device, and separately adjustable supporting devices for said power device, having three different locations with respect to its length, disposed so as to mutually coact with each other.

35. In apparatus of the class described, the combination of a power device, and separately adjustable, mutually coacting, supporting devices for said power device arranged in three separate planes transverse of the longitudinal axis of said power device.

36. In apparatus of the class described, the combination of a case having an inclined wall, an engine shaft in said case, a starter having a driving connection with said shaft, and supporting devices for said starter, mounted upon said wall, and arranged in three separate planes transverse of said wall and the longitudinal axis of said power device.

37. In apparatus of the class described, the combination of a case having an inclined wall, an engine shaft in said case, a starter having a driving connection with said shaft, and separately adjustable supporting devices for said starter, mounted upon said wall, having three different locations with respect to its length, disposed so as to mutually coact with each other.

Signed at Detroit, Michigan, this 11th day of August, 1916.

JOHN F. DODGE.
HORACE E. DODGE.

Witnesses:
ALFRED H. KNIGHT,
A. A. McPHERSON.